United States Patent
Monteverde (10) Patent No.: US 7,152,059 B2
(45) Date of Patent: Dec. 19, 2006

(54) SYSTEM AND METHOD FOR PREDICTING ADDITIONAL SEARCH RESULTS OF A COMPUTERIZED DATABASE SEARCH USER BASED ON AN INITIAL SEARCH QUERY

(75) Inventor: Dante Monteverde, Barrington Hills, IL (US)

(73) Assignee: Emergency24, Inc., Chicago, IL (US)

( * ) Notice: Subject to any disclaimer, the term of this patent is extended or adjusted under 35 U.S.C. 154(b) by 99 days.

(21) Appl. No.: 10/064,944

(22) Filed: Aug. 30, 2002

(65) Prior Publication Data

US 2003/0037050 A1 Feb. 20, 2003

(51) Int. Cl.
*G06F 17/30* (2006.01)
*G06F 7/00* (2006.01)

(52) U.S. Cl. .................... 707/3; 707/4; 707/5
(58) Field of Classification Search .............. 707/6, 707/3, 4, 5
See application file for complete search history.

(56) References Cited

U.S. PATENT DOCUMENTS

| | | | |
|---|---|---|---|
| 5,020,019 A | 5/1991 | Ogawa | |
| 5,297,042 A | 3/1994 | Morita | |
| 5,745,899 A | 4/1998 | Burrows | |
| 5,848,407 A | 12/1998 | Ishikawa et al. | |
| 5,850,433 A | 12/1998 | Rondeau | |
| 5,864,845 A | 1/1999 | Voorhees | |
| 5,911,146 A | 6/1999 | Johari et al. | |
| 5,920,854 A | 7/1999 | Kirsch et al. | |
| 5,920,859 A | 7/1999 | Li | |
| 5,970,486 A | 10/1999 | Yoshida et al. | |
| 5,987,457 A | 11/1999 | Ballard | |
| 5,991,756 A * | 11/1999 | Wu ............................. | 707/3 |
| 6,006,225 A | 12/1999 | Bowman et al. | |
| 6,009,410 A | 12/1999 | LeMole et al. | |
| 6,070,157 A | 5/2000 | Jacobson et al. | |
| 6,070,158 A | 5/2000 | Kirsch et al. | |
| 6,078,866 A | 6/2000 | Buck et al. | |
| 6,148,289 A | 11/2000 | Virdy | |
| 6,169,986 B1 | 1/2001 | Bowman et al. | |
| 6,178,419 B1 | 1/2001 | Legh-Smith | |
| 6,182,065 B1 | 1/2001 | Yeomans | |
| 6,208,988 B1 | 3/2001 | Schultz | |
| 6,269,361 B1 | 7/2001 | Davis et al. | |
| 6,308,202 B1 | 10/2001 | Cohn et al. | |
| 6,321,220 B1 | 11/2001 | Dean et al. | |
| 6,321,228 B1 | 11/2001 | Crandall et al. | |
| 6,327,590 B1 | 12/2001 | Chidlovskii et al. | |
| 6,336,112 B1 | 1/2002 | Chakrabarti | |
| 6,345,273 B1 * | 2/2002 | Cochran ...................... | 707/4 |

(Continued)

*Primary Examiner*—Frantz Coby
*Assistant Examiner*—Cindy Nguyen
(74) *Attorney, Agent, or Firm*—Seyfarth Shaw LLP (57) ABSTRACT

A method of predicting the search needs of a computerized database search user. The present invention uses a topical database comprising a plurality of categories. Each category is referenced and/or related to other categories. The present invention also uses a document database and an anticipated search term database wherein documents and anticipated search terms are correspondingly assigned to a respective topical category. Upon receiving an initial search term, the present invention locates the initial search term within the anticipated search term database and assigns the topical category of the matched anticipated search term to the initial search term. The present invention then retrieves document information for assigned documents of the topical category assigned to the initial search term as well as retrieves document information for assigned documents of any referenced and/or related topical categories to the initial search term topical category.

15 Claims, 6 Drawing Sheets

U.S. PATENT DOCUMENTS

| | | | |
|---|---|---|---|
| 6,356,899 B1 * | 3/2002 | Chakrabarti et al. | 707/5 |
| 6,363,379 B1 | 3/2002 | Jacobson | |
| 6,370,525 B1 | 4/2002 | Kaufman | |
| 6,370,527 B1 | 4/2002 | Singhal | |
| 6,377,961 B1 | 4/2002 | Ryu | |
| 6,397,211 B1 | 5/2002 | Cooper | |
| 6,397,212 B1 | 5/2002 | Biffar | |
| 6,434,548 B1 | 8/2002 | Emens et al. | |
| 6,496,818 B1 | 12/2002 | Ponte | |
| 6,647,383 B1 * | 11/2003 | August et al. | 707/3 |
| 6,678,694 B1 * | 1/2004 | Zimmermann et al. | 707/102 |
| 6,701,314 B1 | 3/2004 | Conover | |
| 6,704,729 B1 * | 3/2004 | Klein et al. | 707/5 |
| 6,785,671 B1 * | 8/2004 | Bailey et al. | 707/3 |
| 2002/0023085 A1 * | 2/2002 | Keith, Jr. | 707/5 |
| 2002/0099700 A1 * | 7/2002 | Li | 707/5 |
| 2003/0004781 A1 * | 1/2003 | Mallon et al. | 705/10 |
| 2003/0018659 A1 * | 1/2003 | Fuks et al. | 707/500 |
| 2003/0061219 A1 | 3/2003 | Monteverde | |
| 2003/0212669 A1 * | 11/2003 | Dedhia et al. | 707/3 |

\* cited by examiner

SYSTEM AND METHOD FOR PREDICTING ADDITIONAL SEARCH RESULTS OF A COMPUTERIZED DATABASE SEARCH USER BASED ON AN INITIAL SEARCH QUERY

BACKGROUND OF THE INVENTION

The present invention relates generally to search query prediction. More particularly the present invention relates to predicting subsequent queries and retrieving the search results from the predicted queries based upon an initial search query utilizing a conventional search engine.

Electronic searching for information contained in a database is typically conducted by entering a query term or phrase into a search engine. Typically, the search query returns document results that are based on relevancy to the queried search term(s). With the growing use of the Internet and database technologies, query based searching has grown beyond simply searching databases contained locally within an organization, to searching file systems and external databases over the Internet due to its vast resources and wealth of information. The term document, as used in this application encompasses files, records, pages, Internet sites, data entries, or any other terminology used to identify a unit of a database.

Computer users searching for particular documents conventionally use a typical search engine function, such as Microsoft's Indexing Service Query or the like. The user typically starts his search by entering a query, comprising at least one term, inside the search engine input box. The term generally consists of an anticipated keyword or string of search terms, which the search engine then uses to search its database and generate a return list of documents containing such keyword(s) or are pre-designated as being related to such keyword(s). Preferably, only documents that are relevant to the queried search term are returned in the return list to avoid confusing and overwhelming the user with numerous irrelevant results. However, as is typically confronted using conventional search engines, many documents may be relevant to the queried term(s) and thus a result of thousands, if not millions, of documents may be provided in the results list, thus frustrating the user's task by requiring a manual review of each result returned to find the desired document. Additionally, the user may inadvertently select the incorrect term used within the search query and the desired document list is not returned.

To combat this problem, some existing search engines have implemented refinement processes that attempt to limit or filter the user's search in order to narrow the amount of documents returned in the return list. An typical existing refinement process works by suggesting related query terms directly to the user based on the user's previous queried term(s). This process, generally called frequency searching, uses previous searches of the existing search user as a method of refinement by comparing the frequency the user has previously used certain terms in conjunction with other terms during a previous search. The process then attempts to provide refined search words by recommending combinations or related terms based upon that comparison. As such, this process is wholly dependent upon the frequency that exact search terms have historically been submitted. However, as anticipated, a limitation of this process is that it is confined to search terms previously used by the search user and thus does not have the capability to accurately and efficiently predict keywords that can be utilized. The present invention overcomes this limitation by not being dependent upon the terms previously utilized by the user.

Another existing search engine refinement process is the use of not only the existing user's previously used terms, but the frequency of used terms based upon a group of searchers. This group can be as enormous as all Internet users or as small as a local area network. This process utilizes the same comparison technique as described above but has enhanced its abilities by enlarging its comparable terms. Again, however, a limitation of this process is that the refined search terms are dependent upon the terminology of other finite searchers. The present invention overcomes this limitation by not being dependent upon the terminology used by other searchers.

Yet another search engine refinement process is determining the frequency of occurrence of a search term within each of the documents that are generated by the initial search. After the search engine identifies the most frequently used term(s) within a document it presents these terms to the user as feasibly "related" terms for the user to use in order to refine his search. A limitation of this process is that the related terms are confined to the finite verbiage and term usage contained within the resultant documents. The present invention overcomes this limitation by not being confined to terms contained within a resultant document.

Yet, there is missing in the art a reliable and accurate method of predicting the search user's additional needs based upon the initial search query. For example, the return lists generated by the search engines of the existing processes do not anticipate potential needs of the searcher but rather produce results based either on the initial queried search term(s) or the terminology utilized by other searchers and are thus rather limited in their scope and applicability. The present invention overcomes these limitations by, for example, anticipating what the search user may need by relating the search term to a plurality of pre-defined categories, wherein each category has a number of documents associated with it.

The present invention overcomes the disadvantages and/or shortcomings of known prior art search result providers and provides a significant improvement thereover.

BRIEF SUMMARY OF THE INVENTION

It is therefore an object of the present invention to provide a system and method for efficiently and accurately predicting additional search needs of the user based on an initial search query executed through a conventional search engine.

A further object of the present invention is to provide a system and method that reduces the time a user spends on searching for documents by providing a return list of documents in real time, that in a single command simultaneously produces a return list that is comprised of directly relevant results and results that predict other needs of the searcher.

A still further object of the present invention is to provide a system and method to all platforms utilizing or benefiting from existing search engine functionality.

Yet another object of the present invention is to provide a system and method that works in conjunction with return lists generated by conventional processes or as a uniquely separate return list on the specified platform.

It is also an object of the current invention to provide users with a predictive results list that will be arranged according to a document or category that can be used to enhance, compliment, strengthen, safeguard, or be used as an accessory to the original document or topical category listings selected by a service provider.

The present invention is a unique and novel process for conducting queried searches through a conventional search engine by providing a system and method for reliably and accurately predicting additional search results and needs based on an initial search query.

In the preferred embodiment of the present invention, a user enters a search term or string of search terms in a conventional search engine input box. Once the user submits the initial search query, the search engine produces a list of predicted results based upon that initial search term.

The preferred embodiment of the present invention maintains at least one database containing predefined categories. Each category is created, defined and maintained by a system provider or other 3rd party. Each respective category is preferably inter-related and cross-referenced to other independent categories either based upon their topical contents or other method. Once the categories are defined, anticipated search terms in a search term database are matched to at least one category based on definitional relevancy and/or linguistic usage and more likely they are matched to a plurality of categories. Furthermore, each document maintained in the document database is also matched to at least one predefined category based upon the approximated relationship between the content of the documents and/or the predefined descriptions of each respective category.

Once the user submits an initial search query, only one predefined category is selected based upon the relevancy of the search term to the category and the search term's pre-designation to that category. The present invention selects the most popular category out of all the categories that the search term may belong to by implementing a set of preponderance criteria that calculates the number of times a particular category is selected by searchers in association with each search term used in the initial search, uses a subjective determination made by the editorial department as to which search terms belong to which categories, and/or calculates the number of times a search term is repeated within the pre-designated keywords contained within documents associated with the category.

When the initial category is determined and selected, the process of matching this category to other related or cross-referenced categories begins. The initial category for the search term is subsequently matched to other predetermined topical categories that enhance, compliment, or append the initial category, and thus approximates and predicts additional needs of the user.

After the user submits his or her initial query, a search result list comprising of documents belonging to associated categories is simultaneously displayed, preferably arranged by categories. Alternately, the categories can be arranged statistically, with the most relevant category appearing first followed by the next most relevant and so on. Still alternately, the search service provider can arrange the categories according to a subjective determination. Monetary information can also be used in the area of "Pay-Per-Click" search engines to determine the order that the categories appear. Furthermore, any known relevancy criteria can be used including the preponderance methodology described in this application to order the list of categorical results. Once the categories are ordered, documents are then automatically chosen to appear beneath each category. Documents can be arranged using the same set of criteria listed above for categorical ordering.

Preferably, the predictive search results will be displayed simultaneously with the directly relevant search results. This can be accomplished by simultaneously using multiple display devices, or by using a single device with bifurcation functionality. It should also be noted that the predictive search results can be used independently and be the only return result list.

BRIEF DESCRIPTION OF THE SEVERAL VIEWS OF THE DRAWINGS

The preferred embodiment is herein described in detail with references to the drawings, where appropriate, wherein.

DETAILED DESCRIPTION OF THE INVENTION

The preferred embodiment of the present invention utilizes a method of assigning anticipated search terms and documents to pre-defined topical categories in order to accurately and reliably predict a search user's needs. To achieve this result, the preferred embodiment of the present invention provides a topical category database with at least one pre-defined topical category. The topical categories are preferably defined with a title and a description, somewhat similar to encyclopedic topics. Alternately, the topical categories can be defined with other cataloging references, such as a numeric cataloging system, computer cataloging system, and the like. Each respective topical category is preferably related and cross-referenced with at least one other category based upon their respective topics, subjectively determined to be related, relevant, or adjunct.

Figure 1:
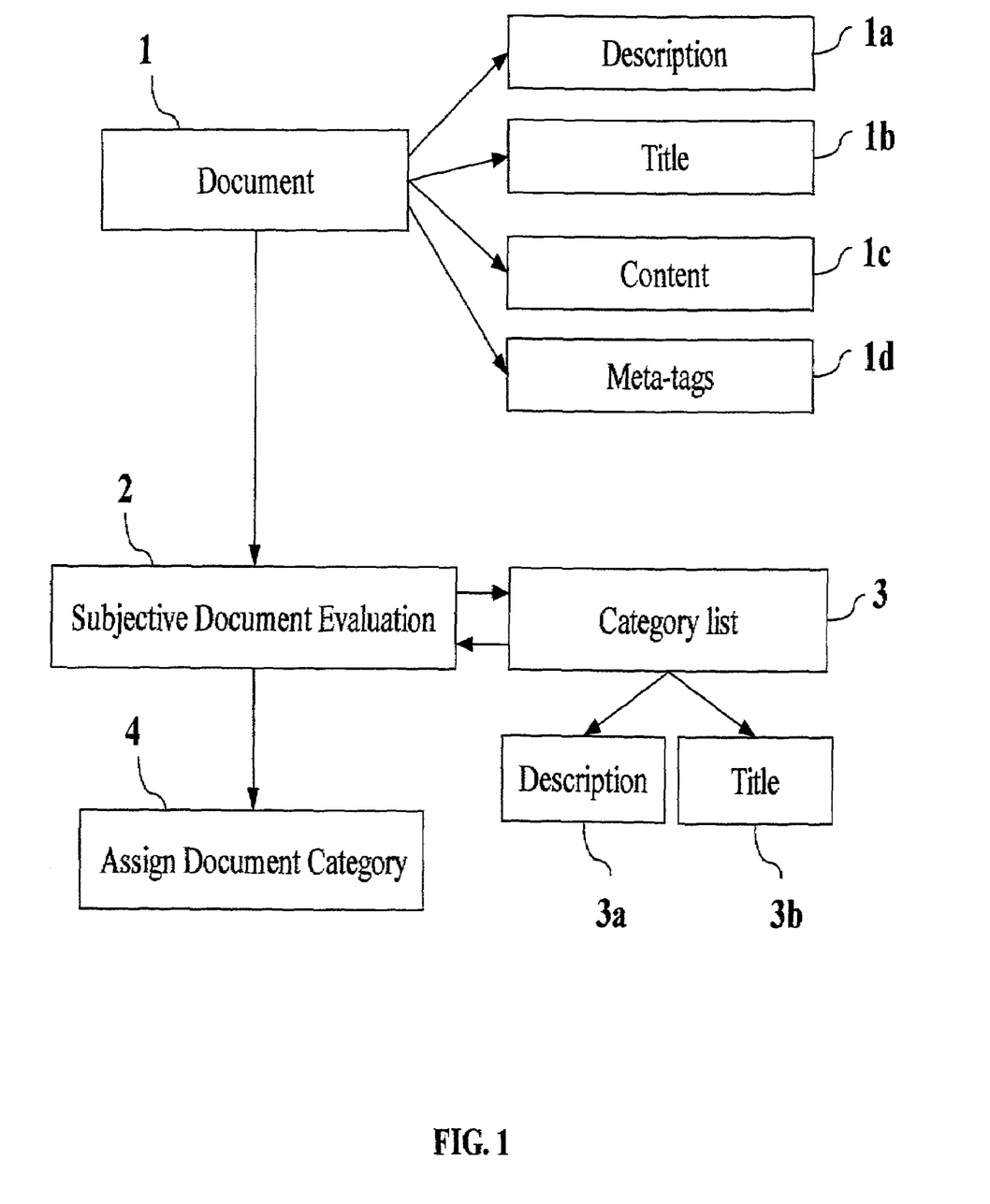
FIG. 1 is a flowchart depicting the preferred embodiment's method of categorizing documents contained within a database.
Figure 2:
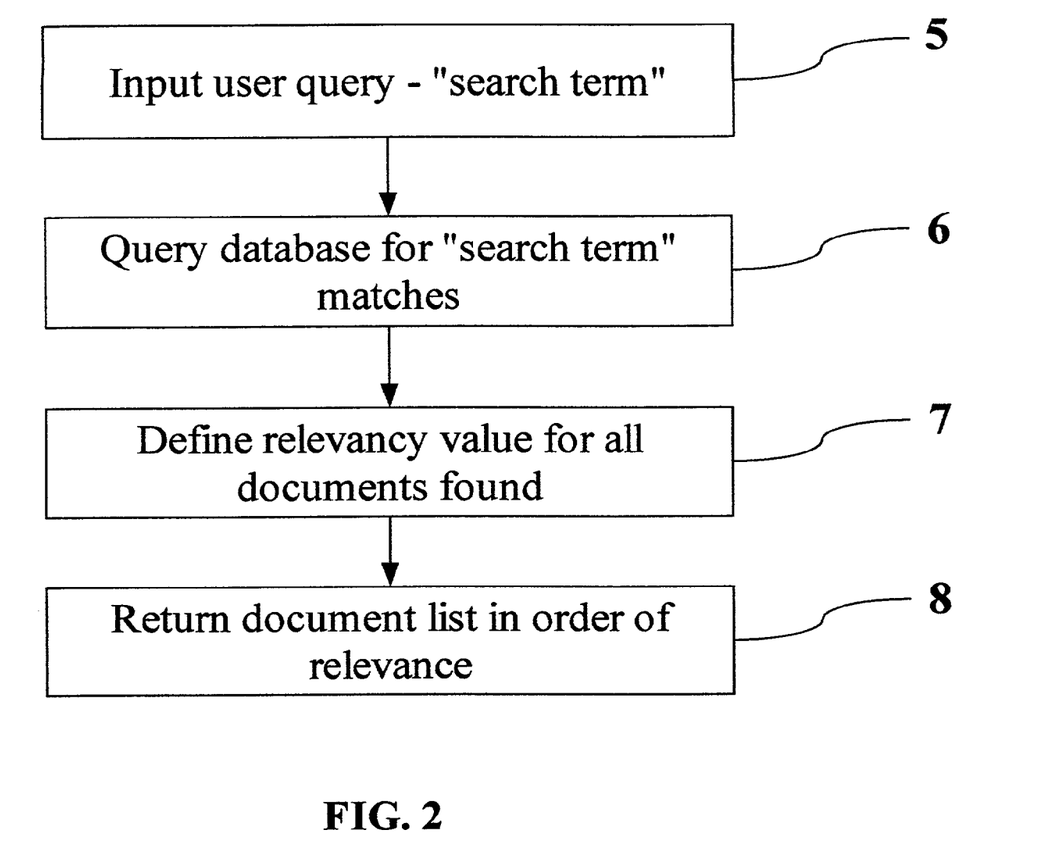
FIG. 2 is a flowchart depicting an existing typical document and search result retrieval system.

The preferred embodiment of the present invention also provides a database of documents with information for at least one document. Preferably, the document database contains information relative to a respective document, such as topic, title, content, author, description, and location. Referring to FIG. 1, the preferred embodiment of the present invention utilizes a subjective determination of systematically assigning a document 1 contained within the present invention's document database to at least one pre-defined topical category in the topical category database utilizing a preferred method where a document 1 is dissected into 4 subparts; a description 1*a*, a title 1*b*, content 1*c*, and meta-tags 1*d*. The sub-parts are used by the search service provider to subjectively evaluate the document 2 and compare the components of the document to the topical category list 3 contained within the topical category database to assign each document to the most relevant and appropriate topical category 4. Alternately, the present invention can categorize a document 1 utilizing any combination of the document's 1 description 1*a*, title 1*b*, content 1*c*, or meta-tags 1*d*. Still alternately, a document can be assigned to a category by using any sub-part exclusively. Preferably, each document is assigned to at least one topical category. Alternately, documents are assigned to a plurality of topical categories.

The preferred embodiment of the present invention also provides a database of anticipated search terms having at least one anticipated search term. The anticipated search terms contained within the anticipated search term database are also assigned to at least one of the pre-defined topical categories contained within the topical category database, as described above, based upon their respective definitions and/or common language usages, thus creating an anticipated search term assignment. As such, anticipated search terms and documents are assigned to common pre-defined topical categories contained within the same topical category database.

Figure 3:
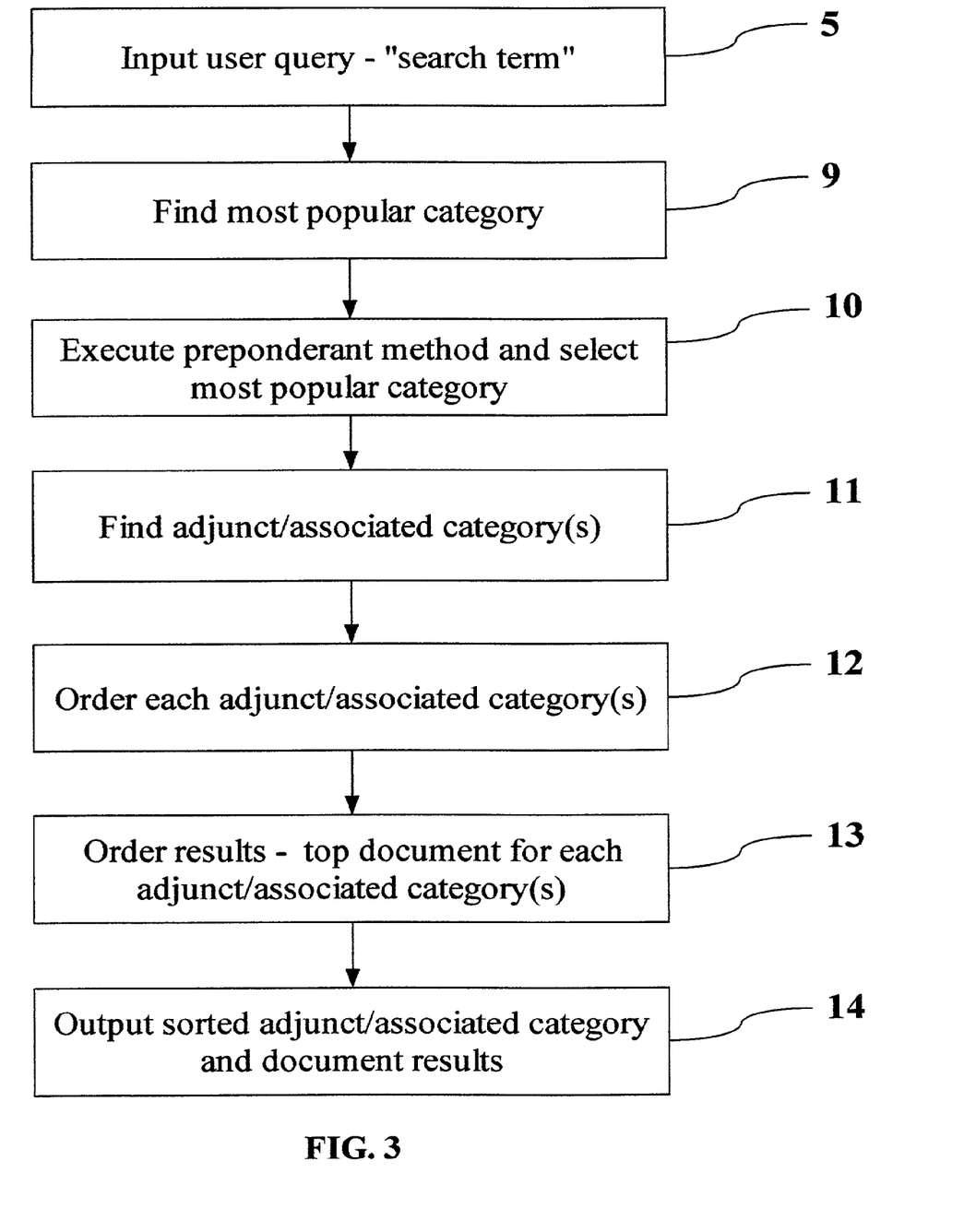
FIG. 3 is a flowchart depicting the preferred embodiment's method of predicting search results.
Figure 4:
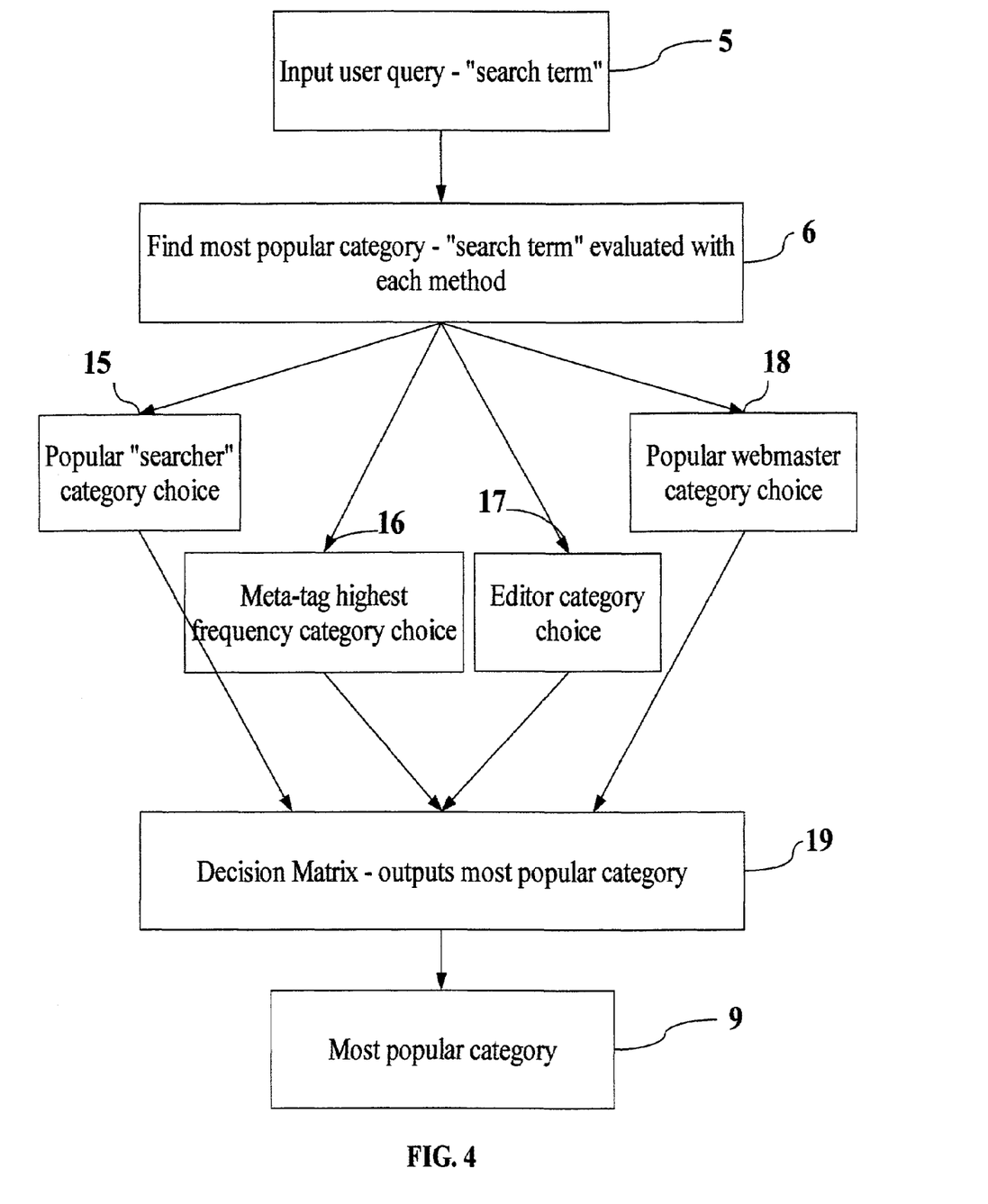
FIG. 4 is a flowchart depicting the preferred embodiment's method of matching keywords to categories utilizing the preferred preponderance method.

Referring to FIGS. 3 and 4, the preferred embodiment of the present invention begins when a search user sends at least one desired initial search term 5 to the present invention via a conventional search term input box. The initial search term preferably contains at least one word the search user desires to search. Alternately, the initial search term can contain a string of words. After receiving the initial search term, the present invention finds the most popular topical category 9 assigned to that initial search term. This step is accomplished by accessing the anticipated search term database, matching the initial search term to at least one anticipated search term within the anticipated search term database, and associating the initial search term with the pre-defined topical category(ies) assigned to the matched anticipated search term.

If more than one pre-defined category is assigned to the initial search term, then the preferred embodiment of the present invention utilizes a preponderant method 10 and selects the most popular topical category for that initial search term. The preponderant method preferably finds the most popular topical category 9, either in combination or exclusivity, by calculating the number of times a particular category is selected by searchers in association with each search term used in the initial search, termed popular "searcher" category choice 15, calculating the number of times a search term is repeated within the pre-designated keywords contained within documents associated with the category, termed highest frequency category choice 16, or a subjective determination made by the service provider to automatically assign a most popular category 17.

Figure 5:
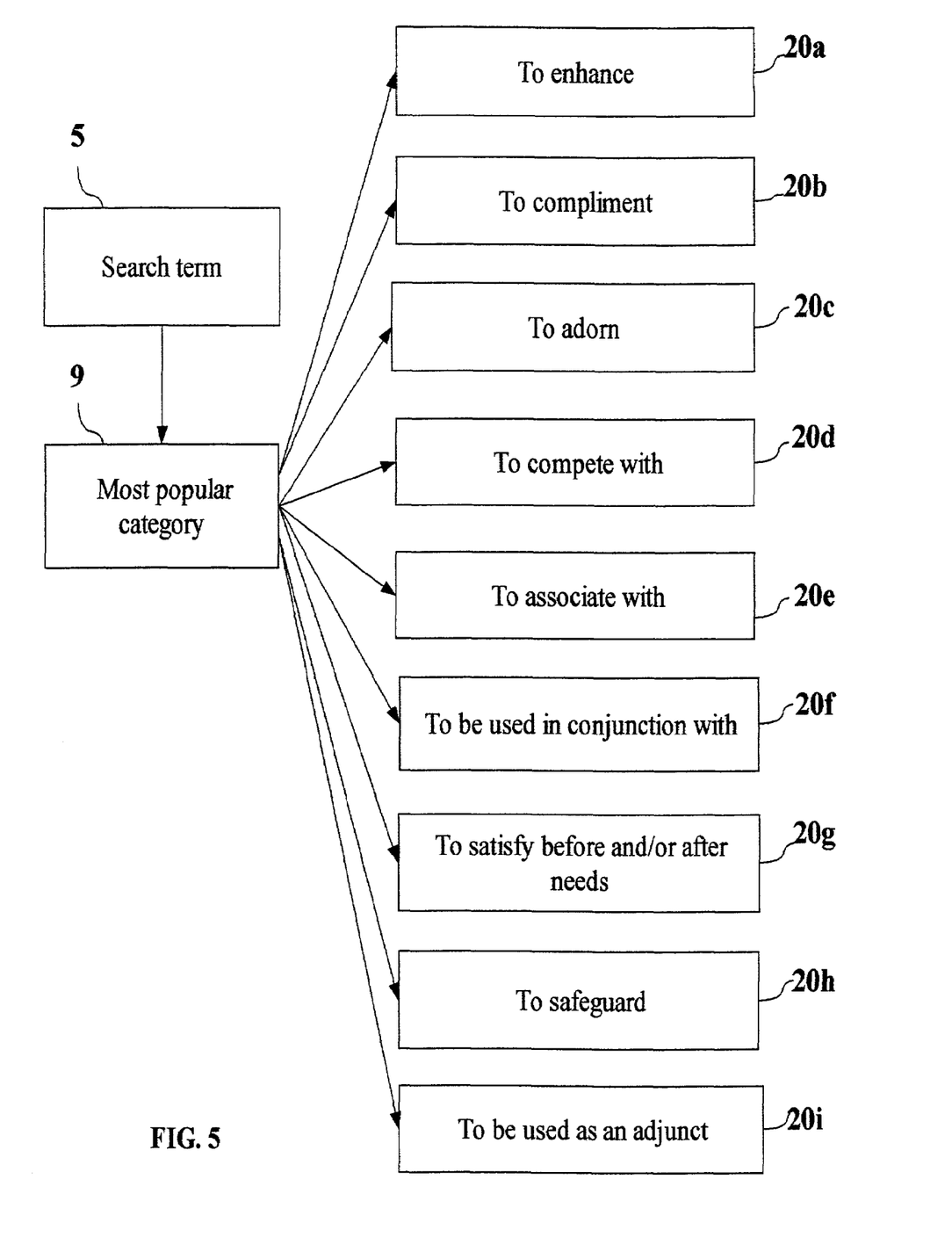
FIG. 5 is a flowchart depicting the preferred embodiment's method of determining associated categories of the initial category.

After assigning a most popular topical category 9 to the initial search term 5, the preferred embodiment of the present invention finds any associated categories of the initial search term 11 by associating the initial search term 5 with topical categories designated as inter-related and cross-referenced with the most popular topical category 9 assigned to the initial search term 5 and any other assigned categories of the initial search term.

The present invention then organizes each associated category 12. The preferred embodiment organizes each successive associated category based upon the relevancy of the initial search term and the associated category. Alternately, successive associated categories may be organized statistically, most accessed, most documents assigned to the respective category, and the like.

The present invention then returns the document results for the requested initial search term 13 based upon the keywords of the respective documents matching the initial search term. Preferably, the most popular category search results are listed first, by listing all documents assigned to the most popular category. It is anticipated that the most popular category assigned to the initial search result will contain the information that the search user was initially searching for. The present invention also displays the resultant documents assigned to the associated categories of the initial search result, which attributes the predictive nature of the present invention. Preferably the associated category documents are displayed contemporaneously with the document results of the most popular category. Alternately, the associated category documents are displayed by utilizing a split-screen configuration on a single display device or by providing a link to a new result page list. Furthermore, the document results are preferably in a form of hypertext links to the designated location of the document. Alternately, the actual documents themselves can be displayed.

Figure 6:
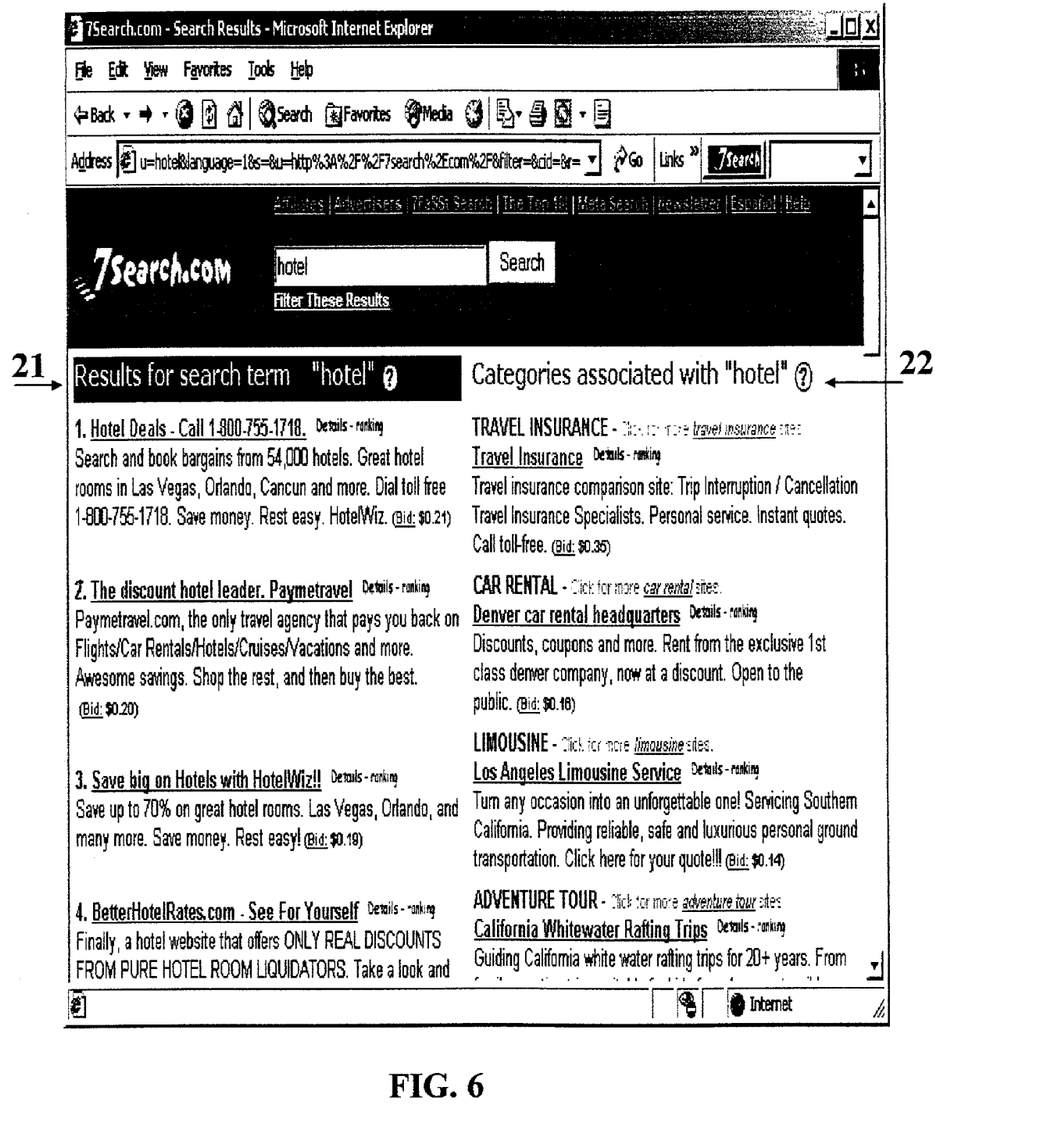
FIG. 6 is an example of a specific embodiment of the present invention as it relates to an online Pay-Per-Click search engine.

The present invention can be better illustrated with the following example which is intended to explain, and not limit, the invention. Referring to FIG. 6, an example embodiment of the present invention reflecting the use of the present invention in an online Internet search engine setting, where a searcher enters an initial search term 5 "hotel" in the search input box, submits the search to the search engine provider, and a conventional split-column return list is displayed containing a most popular category documents results list 21 and an associated category documents result list 22, where each associated category 12 and document information 23 are listed in ranked order as determined by the subjective/objective criteria selected by search engine provider (in this example, the criteria was the bid amount).

While preferred and alternate embodiments have been described herein, it is to be understood that these descriptions are only illustrative and are thus exemplifications of the present invention and shall not be construed as limiting. It is to be expected that others will contemplate differences, which, while different from the foregoing description, do not depart from the true spirit and scope of the present invention herein described and claimed.

What is claimed is:

1. A method of predicting search needs of a computerized database search user comprising the steps of:

providing a topical category database, said topical category database containing a plurality of topical categories;

relating each of said topical categories with other said topical categories contained within said topical category database;

providing a document database, said document database having respective document information for a plurality of documents;

assigning each of said documents to at least one said topical category;

providing an anticipated search term database, said anticipated search term database having at least one anticipated search term;

assigning each of said anticipated search terms in said anticipated search term database to at least one said topical category thereby creating an anticipated search term assignment;

receiving at least one initial search term;

matching said initial search term with at least one said anticipated search term contained within said anticipated search term database thereby creating a matched search term;

associating said initial search term with the topical category assigned to said matched search term thereby creating an initial topical category;

associating said initial search term to all topical categories related to said initial topical category thereby creating related categories; and automatically retrieving said document information of all said documents assigned to said related categories.

2. The method as claimed in claim 1 where each said topical category is defined with a title and description.

3. The method as claimed in claim 1 wherein the step of relating each of said topical categories with other said topical categories contained within said topical category database further comprises the step of relating each of said topical categories with other relevant topical categories.

4. The method as claimed in claim 1 wherein the step of relating each of said topical categories with other said topical categories contained within said topical category database further comprises the step of relating each of said topical categories with other related topical categories.

5. The method as claimed in claim 1 wherein the step of relating each of said topical categories with other said topical categories contained within said topical category database further comprises the step of relating each of said topical categories with other adjunct topical categories.

6. The method as claimed in claim 1 wherein the step of assigning each of said documents to at least one said topical category further comprises the step of assigning each of said documents to a relevant topical category.

7. The method as claimed in claim 1 wherein the step of assigning each of said anticipated search terms in said anticipated search term database to at least one said topical category thereby creating an anticipated search term assignment further comprises the step of assigning each of said anticipated search terms to a topical category based on said anticipated search term's definition.

8. The method as claimed in claim 1 wherein the step of associating said initial search term with the topical category assigned to said matched search term thereby creating an initial topical category further comprises the step of calculating the most popular initial topical category for said matched search term.

9. The method as claimed in claim 8 wherein the step of calculating the most popular initial topical category for said matched search term further comprises the step of calculating the number of times a topical category is selected by other searchers in association with each said initial search term used.

10. The method as claimed in claim 8 further comprising the step of calculating the number of times said initial search term is repeated within the content of said document assigned to said topical category.

11. The method as claimed in claim 8 further comprising the step of subjectively determining said most popular initial topical category.

12. The method as claimed in claim 1 wherein said initial search term comprises at least one word.

13. A method of predicting search needs of a computerized database search user comprising the steps of:
providing a topical category database, said topical category database containing a plurality of topical categories;
relating each of said topical categories with other said topical categories contained within said topical category database;
providing a document database, said document database having document information for at least one document;
assigning each of said documents to at least one said topical category;
providing an anticipated search term database, said anticipated search term database having at least one anticipated search term;

assigning each of said anticipated search terms in said anticipated search term database to at least one said topical category thereby creating an anticipated search term assignment;
receiving at least one initial search term;
matching said initial search term with at least one said anticipated search term contained within said anticipated search term database thereby creating a matched search term;
associating said initial search term with the topical category assigned to said matched search term thereby creating an initial topical category;
associating said initial search term to all topical categories related to said initial topical category thereby creating related categories;
automatically retrieving said document information of all said documents assigned to said related categories, thereby created retrieved documents; and
displaying said retrieved document information.

14. A method of predicting search needs of a computerized database search user comprising the steps of:
providing a topical category database, said topical category database containing a plurality of topical categories;
relating each of said topical categories with other said topical categories contained within said topical category database;
providing a document database, said document database having respective document information for a plurality of documents;
assigning each of said documents to at least one said topical category;
providing an anticipated search term database, said anticipated search term database having at least one anticipated search term;
assigning each of said anticipated search terms in said anticipated search term database to at least one said topical category thereby creating an anticipated search term assignment;
receiving at least one initial search term;
matching said initial search term with at least one said anticipated search term contained within said anticipated search term database thereby creating a matched search term;
associating said initial search term with the topical category assigned to said matched search term thereby creating an initial topical category;
associating said initial search term to any topical categories related to said initial topical category thereby creating related categories; and
automatically retrieving said document information of any said documents assigned to any said related categories, irrespective of a relevancy between said initial search term and any said related categories.

15. A method of predicting search needs of a computerized database search user comprising the steps of:
providing a topical category database, said topical category database containing a plurality of topical categories;
relating each of said topical categories with other said topical categories contained within said topical category database;
providing a document database, said document database having respective document information for a plurality of documents;

assigning each of said documents to at least one said topical category;

providing an anticipated search term database, said anticipated search term database having at least one anticipated search term;

assigning each of said anticipated search terms in said anticipated search term database to at least one said topical category thereby creating an anticipated search term assignment;

receiving at least one initial search term;

matching said initial search term with at least one said anticipated search term contained within said anticipated search term database thereby creating a matched search term;

associating said initial search term with the topical category assigned to said matched search term thereby creating an initial topical category;

associating said initial search term to any topical categories related to said initial topical category thereby creating related categories; and automatically retrieving said document information of any said documents assigned to any of said related categories, including said document information of any said documents assigned to related categories which are not relevant to said initial search term.

* * * * *